(12) United States Patent
Ito

(10) Patent No.: US 7,319,963 B2
(45) Date of Patent: Jan. 15, 2008

(54) VOICE RECOGNITION SYSTEM PREVENTING LOWERING PERFORMANCE

(75) Inventor: Toshiyuki Ito, Kariya (JP)

(73) Assignee: DENSO Corporation, Kariya (JP)

( * ) Notice: Subject to any disclaimer, the term of this patent is extended or adjusted under 35 U.S.C. 154(b) by 940 days.

(21) Appl. No.: 10/442,462

(22) Filed: May 21, 2003

(65) Prior Publication Data

US 2003/0220797 A1    Nov. 27, 2003

(30) Foreign Application Priority Data

May 23, 2002  (JP) .............................. 2002-149147

(51) Int. Cl.
*G10L 11/00*     (2006.01)
*G10L 15/20*     (2006.01)

(52) U.S. Cl. ................. 704/275; 704/233; 704/270.1

(58) Field of Classification Search ............... None
See application file for complete search history.

(56) References Cited

U.S. PATENT DOCUMENTS

| 2002/0184373 | A1 * | 12/2002 | Maes ......................... 709/228 |
| 2002/0191562 | A1 * | 12/2002 | Kumaki et al. .............. 370/331 |
| 2005/0119895 | A1 * | 6/2005 | Odinak ...................... 704/270.1 |

FOREIGN PATENT DOCUMENTS

| JP | 358144211 A | * | 8/1983 |
| JP | 61-074426 | | 4/1986 |
| JP | 62-172397 | | 7/1987 |
| JP | 63-265749 | * | 1/1988 |
| JP | 63-265749 | | 11/1988 |
| JP | 09-270831 | | 10/1997 |
| JP | 11-150760 | | 6/1999 |
| JP | 2000-013861 | | 1/2000 |
| JP | 2000-075893 | | 3/2000 |
| JP | 2002-007165 | | 1/2002 |

OTHER PUBLICATIONS

Notice of Reason For Rejection dated May 30, 2006 in Japanese Application No. 2002-149147 with English translation.
Examination Report for corresponding JP Application No. 2002-149147 dated Sep. 1, 2006.

* cited by examiner

*Primary Examiner*—V. Paul Harper
(74) *Attorney, Agent, or Firm*—Harness, Dickey & Pierce, PLC

(57) ABSTRACT

When electric field strength of a reception signal becomes less than a threshold level, an in-vehicle terminal executes one of three operations. The first is that the in-vehicle terminal prohibits input of a voice. The second is that the in-vehicle terminal transmits an inputted voice with a datum indicating radio wave environment to a voice recognition server. The third is that the in-vehicle terminal once stores the inputted voice, and then transmits the inputted voice that has been stored after the electric field strength of the reception signal exceeds the threshold level.

13 Claims, 8 Drawing Sheets

FIG. 7A

INADEQUATE RADIO WAVE ENVIRONMENT!

STOP VOICE INPUT!

INADEQUATE RADIO WAVE ENVIRONMENT!

VOICE INPUT STILL AVAILABLE!

INPUTTED VOICE TO BE POSSIBLY MIS-RECOGNIZED!

INADEQUATE RADIO WAVE ENVIRONMENT!

INPUTTED VOICE TO BE LATER SENT TO SERVER!

— 15

VOICE RECOGNITION SYSTEM PREVENTING LOWERING PERFORMANCE

CROSS REFERENCE TO RELATED APPLICATIONS

This application is based on and incorporates herein by reference Japanese Patent Application No. 2002-149147 filed on May 23, 2002.

FIELD OF THE INVENTION

The present invention relates to a voice recognition system, in which an inputted voice is transmitted from a terminal to a server and recognized by the server. In particular, performance of the voice recognition is prevented from lowering even in noisy condition.

BACKGROUND OF THE INVENTION

There is a voice recognition system in which an inputted voice is transmitted from a terminal to a server and recognized by the server.

For instance, in a vehicle, as a voice of "route search (ráut sə́ ɪtʃ)" uttered by a crew is inputted into an in-vehicle terminal, the in-vehicle terminal transmits the inputted voice to a voice recognition server through a phone network. As the voice recognition server receives the voice, it retrieves and computes a route from a current position of a vehicle to a destination. It then transmits a result of retrieving the route to the in-vehicle terminal through the phone network. As the in-vehicle terminal receives the result, it then displays the result. The crew who uttered "route search" is thereby enabled to recognize the route from the current position to the destination.

Here, the inputted voice is transmitted from the in-vehicle terminal to the voice recognition server through wireless communication. If radio wave environment relating to the wireless communication is deteriorated, quality of the transmitted voice may be lowered (e.g, due to accumulated noise component). This involves high probability of mis-recognition in the voice recognition server or poor performance of the voice recognition.

In the vehicle, there are noisy conditions such as a blasting of an air-conditioner, an output of an audio, or operational noise of wipers. According to a state of the vehicle, the above noises become relatively louder than the inputted voice, so that the quality of the transmitted voice is lowered. Furthermore, operation of some in-vehicle devices may adversely affect wireless communication by acting as a signal noise. This also causes the high probability of mis-recognition in the voice recognition server or the poor performance of the voice recognition.

SUMMARY OF THE INVENTION

It is an object of the present invention to provide a terminal, a voice recognition server, and a voice recognition system that is constituted by the terminal and the voice recognition server, the voice recognition system is enabled to prevent mis-recognition and poor performance of the voice recognition. Here, the terminal is for accepting a voice uttered in a vehicle. The voice recognition server is for executing a voice recognition for the voice transmitted from the terminal via wireless communication.

To achieve the above object, a terminal is provided with the following. It is determined whether radio wave environment relating to the wireless communication or a state of the vehicle meets a condition under which voice recognition can be successfully executed in the voice recognition server. This structure enables the voice recognition system to prevent the mis-recognition, which results in preventing poor performance of the voice recognition.

In accordance with one aspect of the present invention, inputting of the voice in the terminal is prohibited when it is determined that the radio wave environment or the state of the vehicle does not meet the condition. This structure prevents the voice recognition server from executing unsuccessful voice recognition.

In accordance with another aspect, the inputted voice is transmitted from the terminal along with a reference datum indicating the radio wave environment or the state of the vehicle when it is determined that the radio wave environment or the state of the vehicle does not meet the condition. This structure enables the voice recognition to properly execute the voice recognition by recognizing the reference datum.

Furthermore, in accordance with another aspect, the inputted voice is once stored, when it is determined that the radio wave environment does not meet the condition. The stored voice is then transmitted to the voice recognition after it is determined that the radio wave environment meets the condition. This structure enables the voice recognition server to execute the voice recognition for the properly received voice.

BRIEF DESCRIPTION OF THE DRAWINGS

The above and other objects, features and advantages of the present invention will become more apparent from the following detailed description made with reference to the accompanying drawings. In the drawings:

FIGS. 7A, 7B, and 7C are display window images as examples; and

DETAILED DESCRIPTION OF THE PREFERRED EMBODIMENTS

Figure 1:
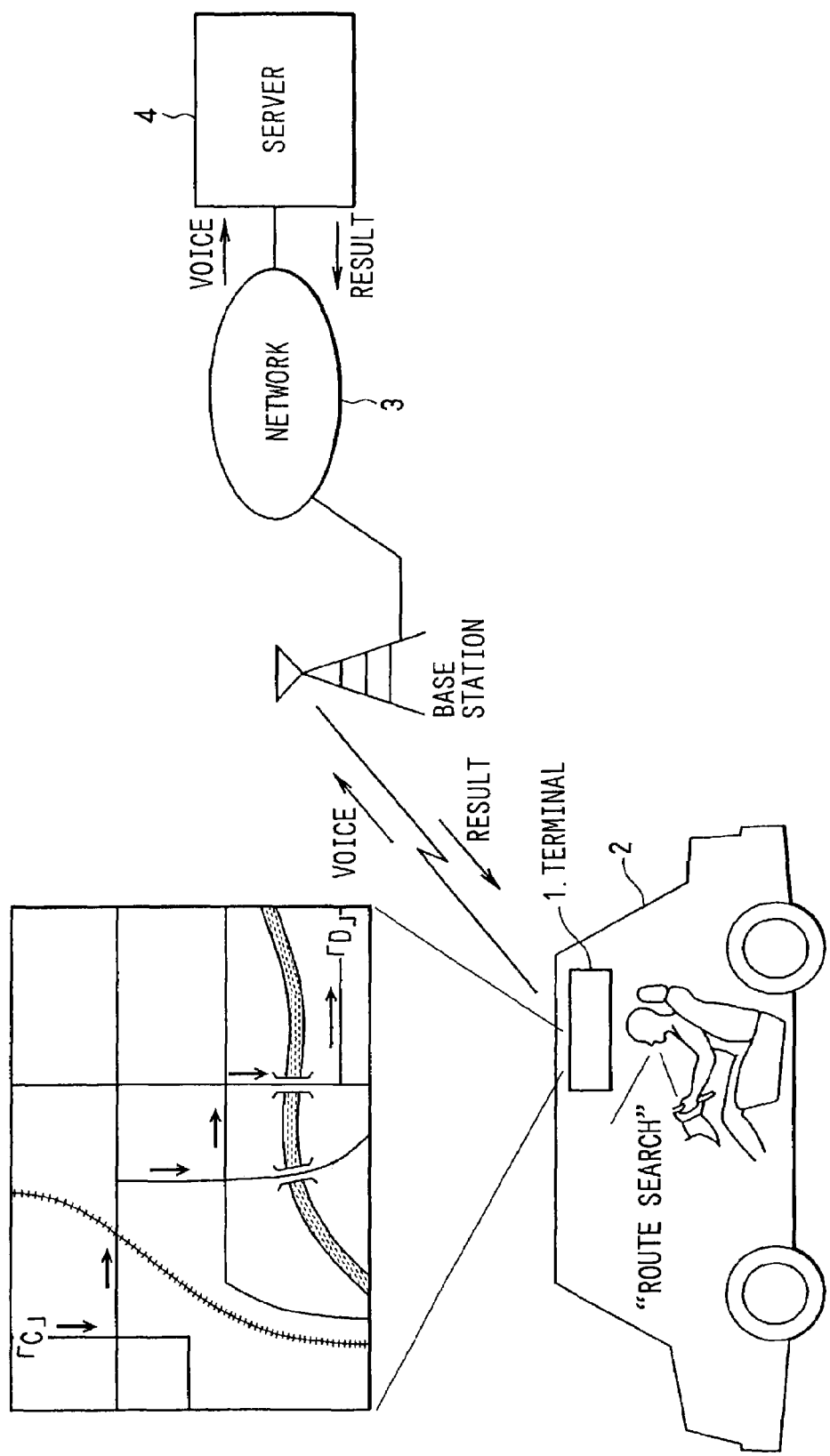
FIG. 1 is a schematic view of a voice recognition system according to an embodiment of the present invention.

An embodiment of an in-vehicle terminal to which the present invention is directed will be explained below. In a voice recognition system shown in FIG. 1, an in-vehicle terminal 1 mounted in a vehicle 2 transmits a voice to a voice recognition server 4 through a phone network 3. The phone network 3 is formed of various phone networks such as a cell phone network, a wired phone network, or the like. As the voice recognition server 4 receives the voice from the in-vehicle terminal 1, it executes voice recognition for the received voice and then executes processing based on a result from the voice recognition.

In detail, as a crew in the vehicle 2 utters "route search (ráut sə́ ɪtʃ)," the in-vehicle terminal 2 transmits a voice of "route search (ráut sə́ ɪtʃ)" to the voice recognition server 4 through the phone network 3. As the voice recognition server 4 receives the voice, it retrieves and computes a route from a current position of the vehicle 2 to a destination of the vehicle 2 to transmit a result of retrieving to the in-vehicle terminal 1 through the phone network 3.

As the in-vehicle terminal 1 receives the result of the retrieving from the voice recognition server 4, it displays the result. The crew that utters "route search (ráut sə́ ɪtʃ)" can thereby recognize the route from the current position to the destination. In FIG. 1, the route is shown in arrows from the current position of the vehicle 1 shown as "C" to the destination shown in "D."

Figure 2:
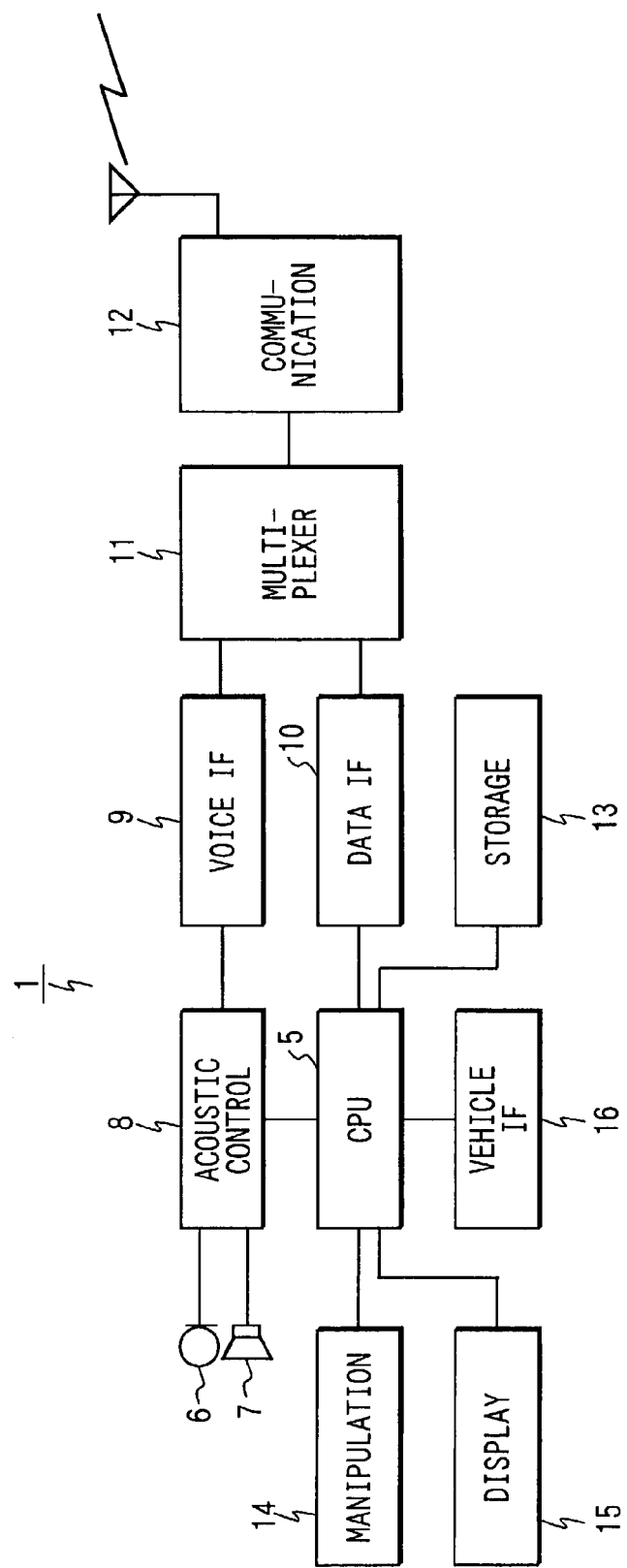
FIG. 2 is a functional block diagram showing electrical structure of an in-vehicle terminal.

As shown in FIG. 2, the in-vehicle terminal 1 includes the following: a CPU (central processing unit) 5 executing a control program; a microphone 6; a speaker 7; an acoustic characteristic control 8; a voice interface (IF) 9; a data interface (IF) 10; a multiplexer 11; a communication unit 12; a storage 13; a manipulation unit 14; a display 15; and a vehicle interface (IF) 16.

The microphone 6 is provided in a position of an interior of the vehicle 2, the position where utterance of the crew of the vehicle 2 is efficiently collected. The microphone 6 outputs the voice inputted by the crew to the acoustic characteristic control 8. The speaker 7 is provided in a position of the interior of the vehicle 2, the position where the crew efficiently listens to a voice outputted from the speaker 7. The speaker 7 externally outputs the voice inputted from the acoustic characteristic control 8.

The acoustic characteristic control 8 controls characteristic of the voice inputted from the microphone 6 to output to the voice interface 9. The acoustic characteristic control 8 controls characteristic of the voice inputted from the voice interface 9 to output to the speaker 7. The voice interface 9 executes processing for transmission of the voice inputted from the microphone 6 through the acoustic characteristic control 8 to output to the multiplexer 11. The voice interface 9 executes processing for reception of the voice inputted from the multiplexer 11 to output to the speaker 7 through the acoustic characteristic control 8. The data interface 10 executes processing for transmission of the data inputted from the CPU 5 to output to the multiplexer 11. The data interface 10 executes processing for reception of the data inputted from the multiplexer 11 to output to the CPU 5.

The multiplexer 11 multiplexes, into a transmission signal, the voice inputted from the voice interface 9 and the data inputted from the data interface 10 to output to the communication unit 12. The multiplexer 11 extracts, from the multiplexed reception signal from the communication unit 12, the voice and the data to output to the voice interface 9 and the data interface 10, respectively. The communication unit 12 transmits, by wireless, the transmission signal inputted from the multiplexer 11. The communication unit 12 receives, by wireless, a reception signal to output to the multiplexer 11.

The storage 13 stores the voice inputted from the microphone 6. The manipulation unit 14 manipulated by the crew includes several keys (buttons). The manipulation unit 14 can be replaced with keys of touch-panel type provided in the display 15. The display 15 shows time, guidance information for notifying the crew of warning, information received from the voice recognition server 4 (e.g., map information), or the like.

The vehicle interface 16 is a device through which operation data indicating operation states of various devices mounted in the vehicle 2 are inputted. The operation data include an air-conditioner operation datum of whether an air-conditioner runs, an audio operation datum of whether an audio runs, and a wipers operation datum of whether the wipers run.

Figure 3:
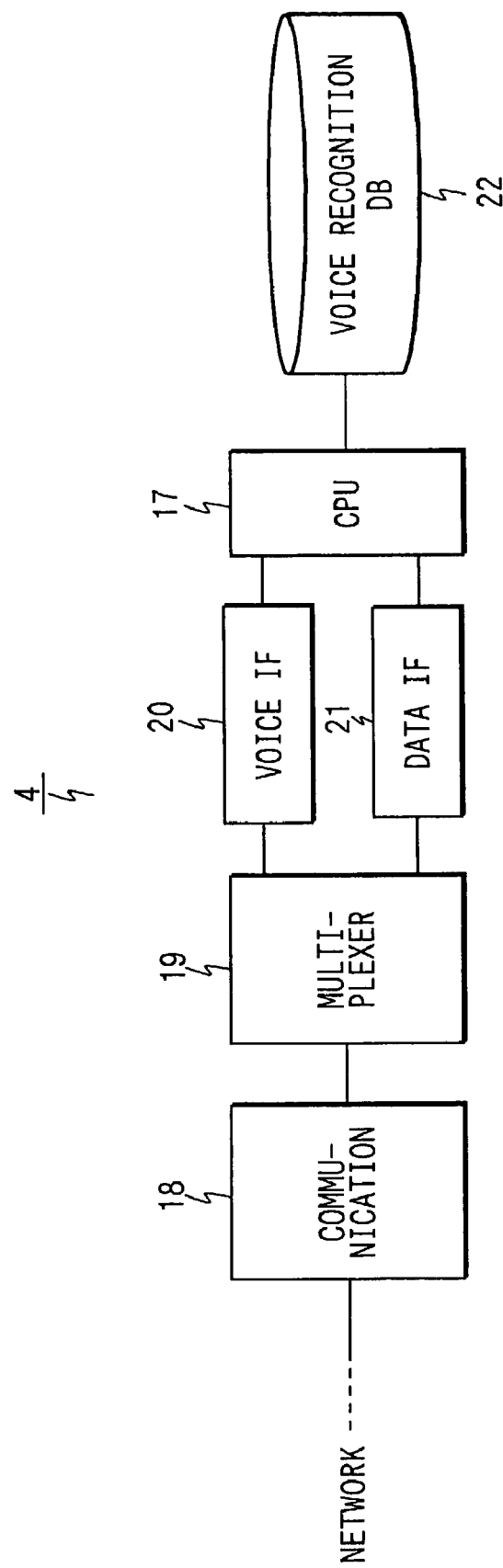
FIG. 3 is a functional block diagram showing electrical structure of a voice recognition server.

As shown in FIG. 3, the voice recognition server 4 includes the following: a CPU 17 for executing a control program; a communication unit 18; a multiplexer 19; a voice interface (IF) 20; a data interface (IF) 21; and a voice recognition database 22.

The communication unit 18 receives, by wireless, a reception signal to output to the multiplexer 19. The communication unit 18 transmits, by wireless, a transmission signal inputted from the multiplexer 19. The multiplexer 19 extracts, from the multiplexed reception signal from the communication unit 18, a voice and data to output to the voice interface 20 and the data interface 21, respectively. The multiplexer 19 multiplexes, into the transmission signal, a voice inputted from the voice interface 20 and data inputted from the data interface 21 to output to the communication unit 18.

The voice interface 20 executes processing for reception of the voice inputted from the multiplexer 19 to output to the CPU 17. The voice interface 20 executes processing for transmission of the voice inputted from the CPU 17 to output to the multiplexer 19. The data interface 21 executes processing for reception of the data inputted from the multiplexer 19 to output to the CPU 17. The data interface 21 executes processing for transmission of the data inputted from the CPU 17 to output to the multiplexer 19. The voice recognition database 22 stores, as a database, data referred to when the CPU 17 executes voice recognition for the voice inputted from the voice interface 20.

Referring to FIGS. 4 to 8, processing of the above structure will be explained below. The processing is classified into two processings:

(1) Processing executed by a CPU 5 of an in-vehicle terminal 1

(2) Processing executed by a CPU 17 of a voice recognition server 4

The two processings will be explained below in order.

(1) Processing Executed by a CPU 5 of an In-Vehicle Terminal

There are three operation modes of a voice input prohibition mode, a radio wave environment data transmission mode, and a voice storage mode. These three operation modes are selected through manipulating the manipulation unit 14 of the in-vehicle 1 by a user. These three operation modes will be explained in order.

(1-1) Voice Input Prohibition Mode

Figure 4:
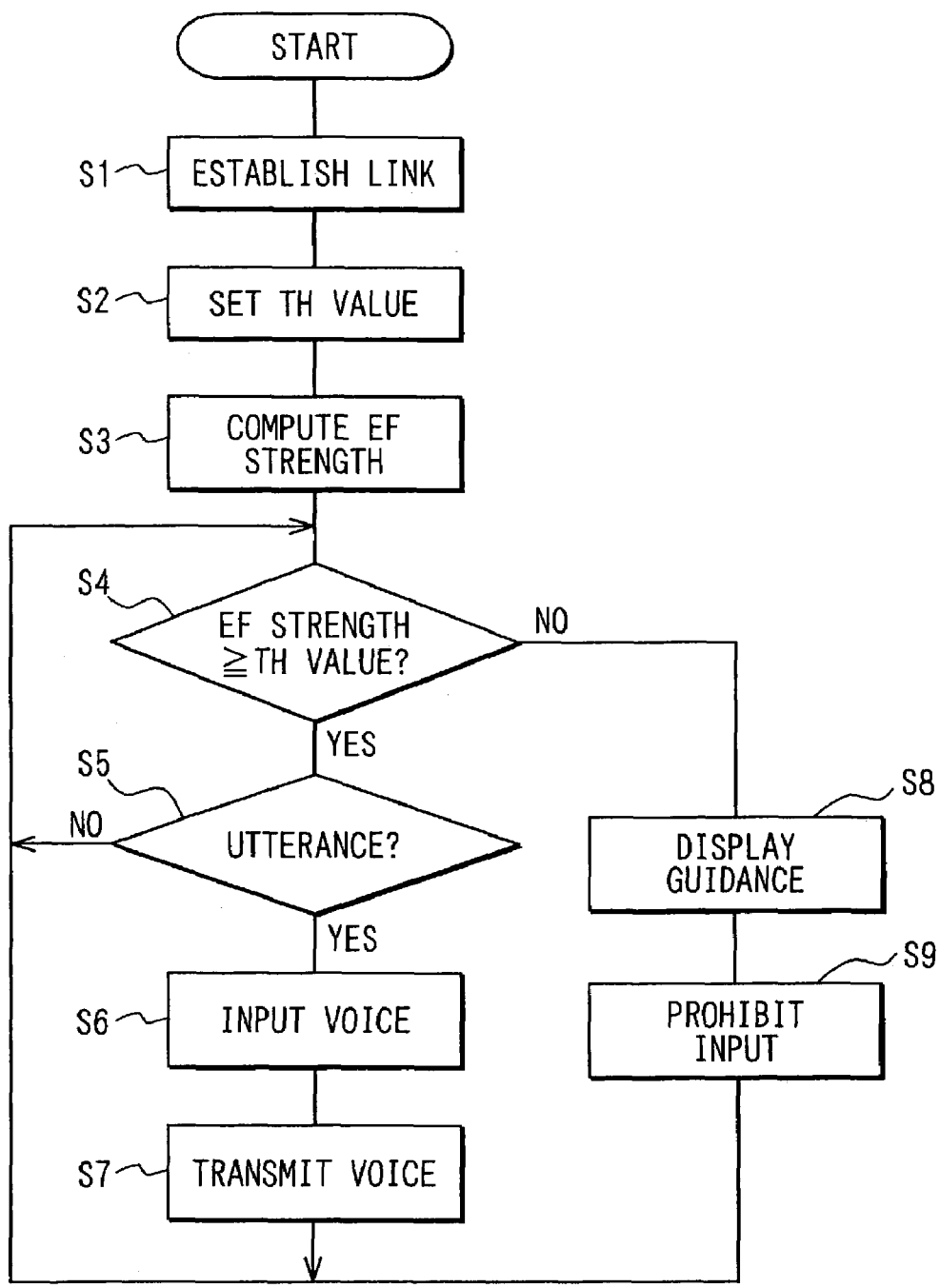
FIGS. 4 to 6 are flowchart diagrams explaining processing of a CPU of the in-vehicle terminal.

Referring to FIG. 4, at Step 1, the CPU 5 establishes a wireless communication link between the in-vehicle terminal 1 and the voice recognition server 4 through the communication unit 12. At Step 2, a threshold value (TH VALUE) is set for determining whether certain radio wave environment is adequate. The threshold value can be previously determined value or a value that is assumed to be an optimum based on past precedents or use environment.

At Step 3, electric field strength (EF STRENGTH) of a reception signal is computed. At Step 4, the electric field strength is compared with the threshold value.

When the electric field strength is determined to be not lower than the threshold value, the radio wave environment relating to the wireless communication link between the in-vehicle terminal 1 and the voice recognition server 4 is regarded to be adequate. The CPU 5 thereby awaits a voice input of utterance of a crew in a vehicle 2. At Step 5, when the voice of the crew is determined to be uttered, the voice is inputted at Step 6 and transmitted from the communication unit 12 through the phone network 3 to the voice recognition server 4 at Step 7.

By contrast, at Step 4, when the electric field strength is determined to be lower than the threshold value, the radio wave environment relating to the wireless communication link between the in-vehicle terminal 1 and the voice recognition server 4 is regarded to be inadequate. A display guidance such as "INADEQUATE RADIO WAVE ENVIRONMENT! STOP VOICE INPUT!" is shown on the display 15 (in FIG. 7A) at Step 8. The voice input is thereby prohibited at Step 9.

As explained above, under the voice input prohibition mode set in the in-vehicle terminal 1, when the electric field strength of the reception signal becomes lower than the threshold value, the voice input is thereafter prohibited and any utterance of the crew cannot be inputted.

At this moment, displaying of the guidance on the display 15 enables the crew to recognize that the voice input is unavailable due to inadequacy of the radio wave environment.

(1-2) Radio Wave Environment Data Transmission Mode

Figure 5:
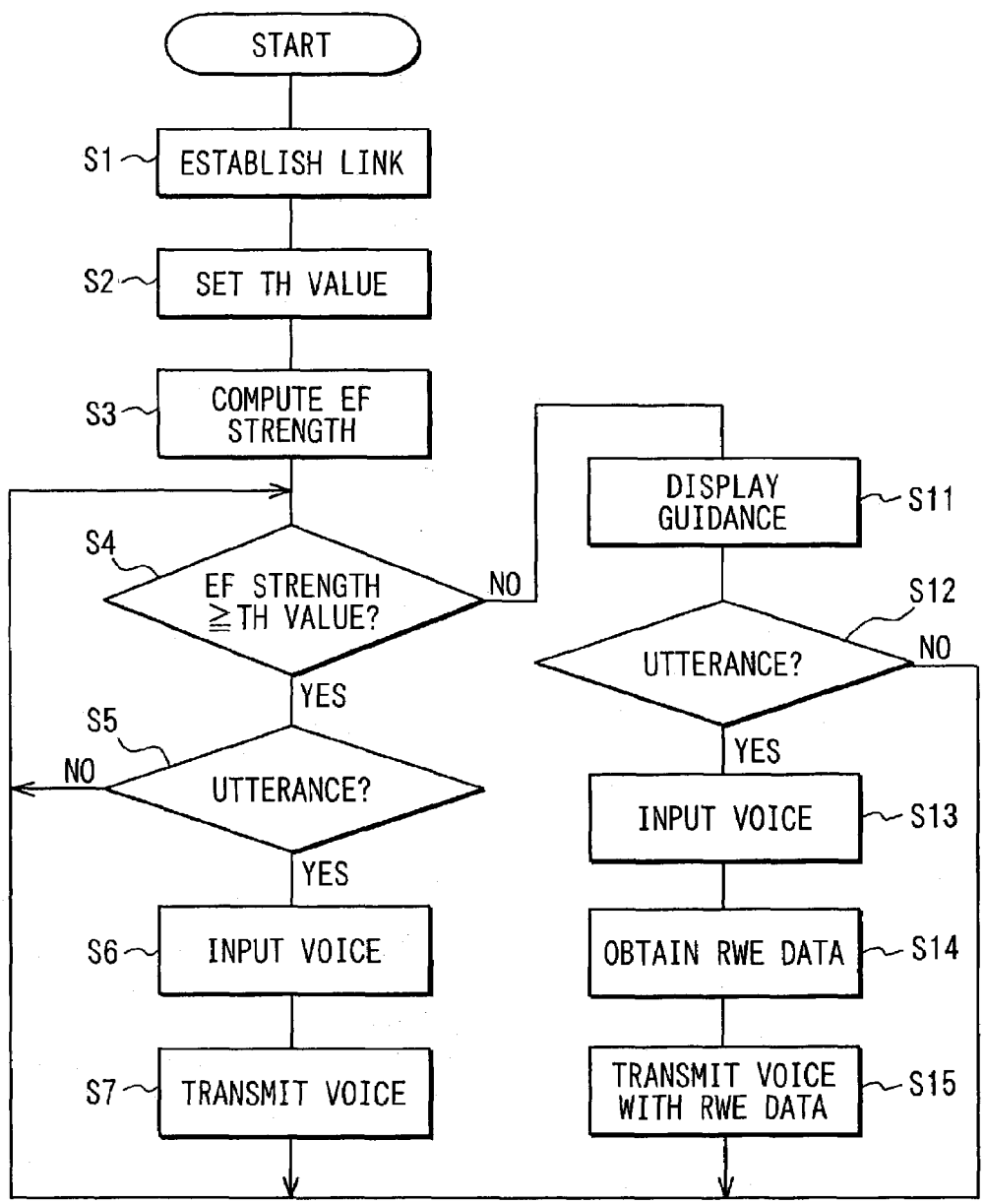

Referring to FIG. 5, when the electric field strength of the reception signal is determined to be lower than the threshold value at Step 4, a display guidance such as "INADEQUATE RADIO WAVE ENVIRONMENT! VOICE INPUT STILL AVAILABLE! INPUTTED VOICE TO BE POSSIBLY MIS-RECOGNIZED!" is shown on the display 15 (in FIG. 7B) at Step 11.

At Step 12, when a voice of the crew is determined to be uttered, the voice is inputted at Step 13. The CPU 5 obtains electric field strength of a reception signal at the time point as radio wave environment data (RWE DATA) indicating the radio wave environment relating to the wireless communication link between the in-vehicle terminal 1 and the voice recognition server 4 at Step 14. The CPU 5 then transmits the inputted voice along with the radio wave environment data from the communication unit 12 through a phone network 3 to the voice recognition server 4 at Step 15.

As explained above, under the radio wave environment data transmission mode set in the in-vehicle terminal 1, when the electric field strength of the reception signal becomes lower than the threshold value, the inputted voice is thereafter transmitted with the radio wave environment data to the voice recognition server 4.

At this moment, displaying of the guidance on the display 15 enables the crew to recognize the possibility that the inputted voice is mis-recongized in the voice recognition server 4 due to inadequacy of the radio wave environment.

(1-3) Voice Storage Mode

Figure 6:
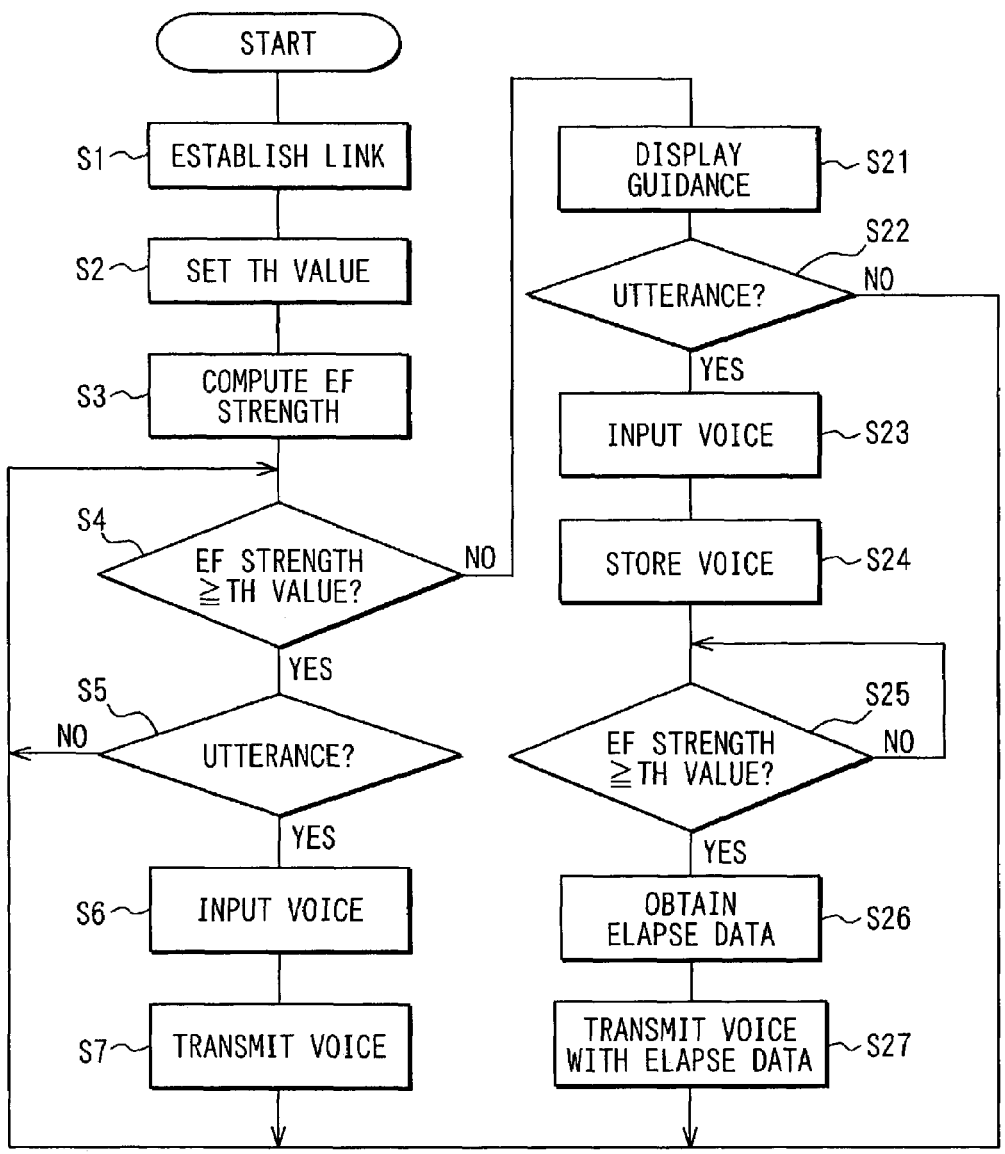

Referring to FIG. 6, when the electric field strength of the reception signal is determined to be lower than the threshold value at Step 4, a display guidance such as "INADEQUATE RADIO WAVE ENVIRONMENT! VOICE INPUT STILL AVAILABLE! INPUTTED VOICE TO BE LATER SENT TO SERVER!" is shown on the display 15 (in FIG. 7C) at Step 21.

At Step 22, when a voice of the crew is determined to be uttered, the voice is inputted at Step 23. The CPU 5 then stores the inputted voice in the storage 13 at Step 24.

At Step 25, electric field strength of a reception signal at the time point is again compared with the threshold value. When the electric field strength is determined to be not lower than the threshold value, the radio wave environment relating to the wireless communication link between the in-vehicle terminal 1 and the voice recognition server 4 is regarded to be adequate. At Step 26, the CPU 5 then obtains elapse data indicating elapsed time from the time when voice is stored in the storage 13. At Step 27, the inputted voice stored in the storage 13 with the elapse data is transmitted to the voice recognition server 4.

As explained above, under the voice storage mode set in the in-vehicle terminal 1, when the electric field strength of the reception signal becomes lower than the threshold value, the voice inputted by utterance of the crew is stored. When the electric field strength of the reception signal becomes not lower than the threshold value, the stored inputted voice is transmitted with the elapse data to the voice recognition server 4.

At this moment, displaying of the guidance on the display 15 enables the crew to recognize that the inputted voice is once stored due to inadequate radio wave environment and to be transmitted to the voice recognition server 4 when the radio wave environment returns to an adequate state.

(2) Processing Executed by a CPU 17 of a Voice Recognition Server 4

Figure 8:
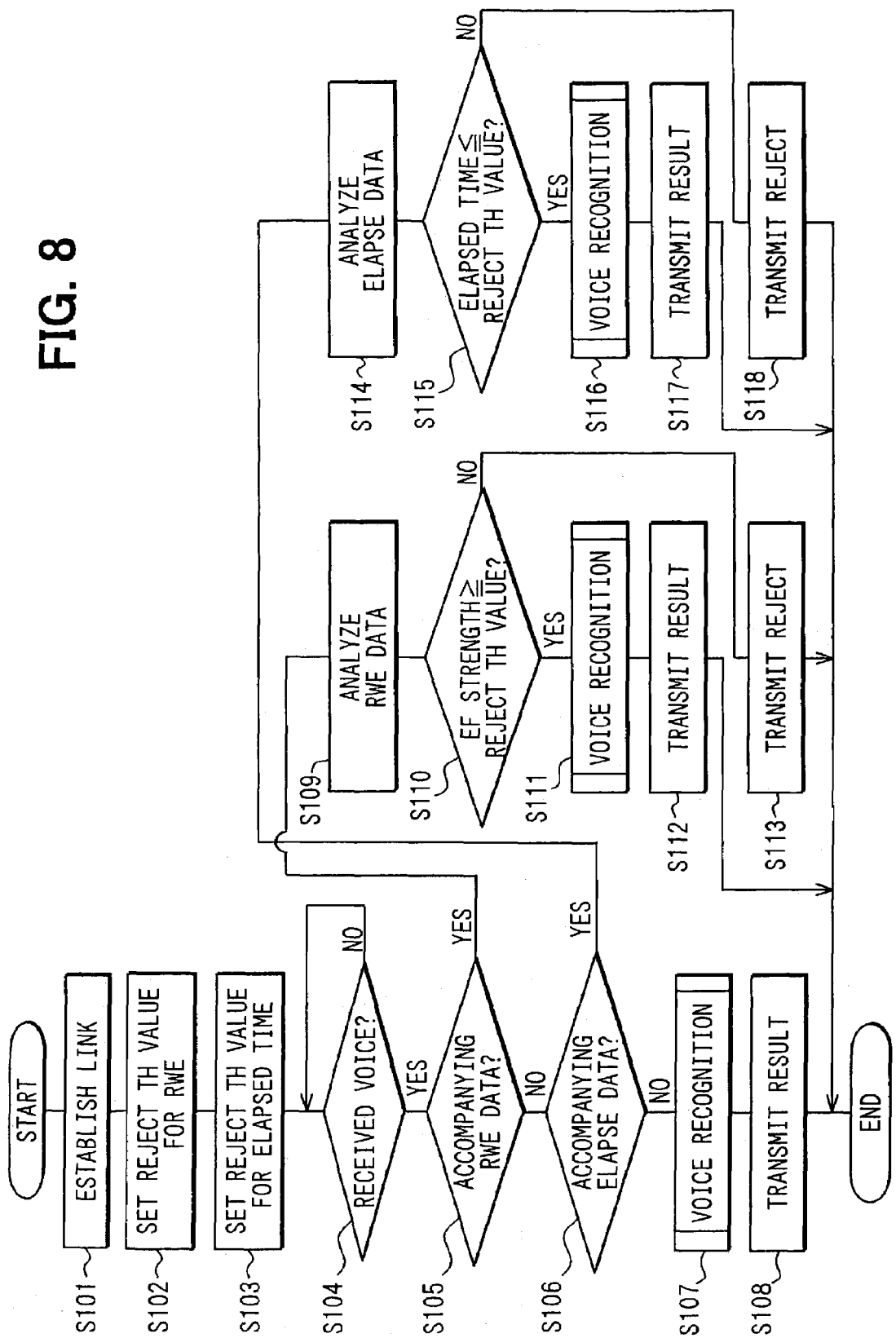
FIG. 8 is a flowchart diagram explaining processing of a CPU of the voice recognition server.

Referring to FIG. 8, at Step 101, the CPU 17 establishes a wireless communication link between the in-vehicle terminal 1 and the voice recognition server 4 through the communication unit 18. At Step 102, a reject threshold value (REJECT TH VALUE) for the radio wave environment is set. At Step 103, a reject threshold value (REJECT TH VALUE) for certain elapsed time is set. Each of the above reject threshold values can be previously determined value or a value that is assumed to be an optimum based on past precedents or use environment.

At Step 104, the voice is received from the in-vehicle terminal 1 through the communication unit 18. At Step 105, whether the received voice is accompanied with the radio wave environment data or the elapse data is determined. When the received voice is determined to be accompanied with no radio wave environment data and no elapse data, the CPU 17 executes voice recognition by referring to the voice recognition database 22 at Step 107. A result of the voice recognition is transmitted to the in-vehicle terminal 1 through the communication unit 18 and the phone network 3 at Step 108.

As explained above, when the voice recognition server 4 receives the voice without any accompanying radio wave environment data or elapse data, the voice recognition server 4 executes the voice recognition to transmit the result of the voice recognition to the in-vehicle terminal 1. Here, no accompanying data to the received voice indicates that radio wave environment is adequate for computing the voice recognition.

By contrast, when the received voice is determined to be accompanied with the radio wave environment data, the radio wave environment data are analyzed at Step 109. The electric field strength indicated in the radio wave environment data is then compared with the reject threshold value for the radio wave environment at Step 110.

When the electric field strength is determined to be not lower than the reject threshold value, the voice recognition is executed by referring to the voice recognition database 22 at Step 111. Here, the voice recognition is executed especially by enhancing voice recognition level for the received voice. A result of the voice recognition is then transmitted to the in-vehicle terminal 1 through the communication unit 18 and the phone network 3 at Step 112.

When the electric field strength is determined to be lower than the reject threshold value, the voice recognition for the voice received from the in-vehicle terminal 1 is rejected and a reject notice signal indicating of rejection of the voice recognition is transmitted to the in-vehicle terminal 1 through the communication unit 18 and the phone network 3 at Step 113.

As explained above, when the voice recognition server 4 receives the voice with the accompanying radio wave environment data, the voice recognition server 4 executes the voice recognition only when the electric field strength is determined to be not lower than the reject threshold value. The result of the voice recognition is then transmitted to the in-vehicle terminal 1. Here, the radio wave environment data accompanying the received voice indicates that the received voice is inputted under the inadequate radio wave environment.

When the received voice is determined to be accompanied with the elapse data, the elapse data are analyzed at Step 114. The elapsed time indicated in the elapse data is then compared with the reject threshold value for the elapsed time at Step 115.

When the elapsed time is determined to be not greater than the reject threshold value, the voice recognition is executed by referring to the voice recognition database 22 at Step 116. A result of the voice recognition is then transmitted to the in-vehicle terminal 1 through the communication unit 18 and the phone network 3 at Step 117.

When the elapsed time is determined to be greater than the reject threshold value, the voice recognition for the voice received from the in-vehicle terminal 1 is rejected. Here, voice recognition after elapsed time greater than the reject threshold value is assumed to be no more useful for the crew due to too late feedback. A reject notice signal indicating of rejection of the voice recognition is then transmitted to the in-vehicle terminal 1 through the communication unit 18 and the phone network 3 at Step 118.

Thus each of the CPU 5 of the in-vehicle terminal 1 and the CPU 17 of the voice recognition server 4 executes the processing in correspondence to the radio wave environment relating to the wireless communication.

According to the above embodiment, under the voice input prohibition mode set in the in-vehicle terminal 1, when the electric field strength of the reception signal becomes lower than the threshold value, the voice input is prohibited and any utterance of the crew cannot be inputted. The voice recognition server 4 thereby receives no voice and executes no voice recognition, so that mis-recogniton of the voice recognition is prevented from occurring. This results in preventing poor performance of the voice recognition from occurring.

In addition, under the radio wave environment data transmission mode set in the in-vehicle terminal 1, when the electric field strength of the reception signal becomes lower than the threshold value, the inputted voice is transmitted with the radio wave environment data to the voice recognition server 4. The voice recognition server 4 thereby recognizes that the received voice is inputted under the inadequate radio wave environment. Hence, the voice recognition is executed with considering the situation, for instance, by enhancing recognition level, so that mis-recogniton of the voice recognition is prevented from occurring. This results in preventing poor performance of the voice recognition from occurring.

Furthermore, under the voice storage mode set in the in-vehicle terminal 1, when the electric field strength of the reception signal becomes lower than the threshold value, the voice inputted by utterance of the crew is stored. When the electric field strength of the reception signal becomes not lower than the threshold value, the stored inputted voice is transmitted with the elapse data to the voice recognition server 4. The voice recognition server 4 thereby receives the temporarily stored voice under the adequate radio wave environment instead of the inadequate radio wave environment, so that mis-recogniton of the voice recognition is prevented from occurring. This results in preventing poor performance of the voice recognition from occurring.

MODIFICATION

The embodiment can be modified below.

Although the invention is directed to an in-vehicle terminal, it can be directed to a terminal which a person carries. Moreover, an in-vehicle terminal can be fixed as an assembled module or detachable from a vehicle.

Although display guidance indicating radio wave environment or vehicle state is shown on a display of a vehicle, by adopting a voice output function voice guidance indicating the radio wave environment or the vehicle state can be outputted through a speaker. The voice guidance can be used along with the display guidance.

The reject threshold value for the radio wave environment or the elapsed time can be set in the voice recognition server according to need.

A control program executed by a CPU of each of an in-vehicle terminal and a voice recognition server can be not only stored at a manufacturing stage, but also downloadable through a network from a certain server or installed by being forwarded from storage media such as CD-DOM (compact disk-read only memory) or other card memories.

What is claimed is:

1. A terminal that is provided in a vehicle and constitutes a voice recognition system with a voice recognition server that executes voice recognition for a voice received from the terminal via wireless communication, the terminal comprising:
    voice inputting means for inputting the voice;
    storing means for storing the inputted voice;
    transmitting means for transmitting the stored voice to the voice recognition server;
    determining means for determining whether a radio wave environment relating to the wireless communication meets a certain condition; and
    controlling means for controlling the storing means for storing the inputted voice when it is determined that the radio wave environment does not meet the certain condition, and the transmitting means for transmitting the stored voice to the voice recognition server after it is determined that the radio wave environment meets the certain condition;
    wherein the stored voice is transmitted to the voice recognition server along with an elapse datum indicating an elapsed time from a time when the inputted voice is stored by the storing means.

2. A terminal according to claim 1, further comprising:
    notifying means for executing notification,
    wherein the controlling means controls the notifying means for executing notification so as to clarify determination by the determining means.

3. A voice recognition server for voice recognition for a voice transmitted via wireless communication from a terminal that is provided in a vehicle and includes:
    voice inputting means for inputting the voice;
    transmitting means for transmitting the inputted voice to the voice recognition server;
    determining means for determining whether at least one case of two cases is unfulfilled, wherein a first case is that a radio wave environment relating to the wireless communication meets a certain condition and a second case is that a state of the vehicle meets a given condition; and controlling means for controlling the transmitting means for transmitting, when at least one case of the two cases is determined to be unfulfilled, to the voice recognition server the inputted voice along with a reference datum indicating one item of two items of the radio wave environment and the state of the vehicle, wherein the one item corresponds to the one case that is determined to be unfulfilled, the voice recognition server comprising:

receiving means for receiving the voice along with the reference datum transmitted from the terminal;

determining means for determining whether the reference datum meets a predetermined condition; and voice recognition means for executing, when it is determined that the reference datum meets the predetermined condition, the voice recognition for the received voice.

4. A voice recognition server for voice recognition for a voice transmitted via wireless communication from a terminal that is provided in a vehicle and includes:

voice inputting means for inputting the voice;

storing means for storing the inputted voice;

transmitting means for transmitting the stored voice to the voice recognition server;

determining means for determining whether a radio wave environment relating to the wireless communication meets a certain condition; and controlling means for controlling the storing means for storing the inputted voice when it is determined that the radio wave environment does not meet the certain condition, and the transmitting means for transmitting the stored voice to the voice recognition server after it is determined that the radio wave environment meets the certain condition, wherein the stored voice is transmitted to the voice recognition server along with an elapse datum indicating an elapsed time from a time when the inputted voice is stored by the storing means, the voice recognition server comprising:

receiving means for receiving the voice along with the elapse datum transmitted from the terminal;

determining means for determining whether the elapse datum meets a predetermined condition; and voice recognition means for executing, when it is determined that the elapse datum meets the predetermined condition, the voice recognition for the received voice.

5. A voice recognition system for a voice uttered in a vehicle, comprising:

a terminal that is provided in the vehicle and accepts the voice; and a voice recognition server that is for executing voice recognition for the voice transmitted via wireless communication from the terminal, wherein the terminal includes:

voice inputting means for inputting the voice;

transmitting means for transmitting the inputted voice to the voice recognition server via the wireless communication;

determining means for determining whether at least one case of two cases is unfulfilled, wherein a first case is that a radio wave environment relating to the wireless communication meets a certain condition and a second case is that a state of the vehicle meets a given condition; and controlling means for controlling the transmitting means for transmitting, when at least one case of the two cases is determined to be unfulfilled, to the voice recognition server the inputted voice along with a reference datum indicating one item of two items of the radio environment and the state of the vehicle, wherein the one item corresponds to the one case that is determined to be unfulfilled, and wherein the voice recognition server includes:

receiving means for receiving the voice along with the reference datum transmitted from the terminal;

determining means for determining whether the reference datum meets a predetermined condition; and voice recognition means for executing, when it is determined that the reference datum meets the predetermined condition, the voice recognition for the received voice.

6. A voice recognition system for a voice uttered in a vehicle, comprising: a terminal that is provided in the vehicle and accepts the voice; and a voice recognition server that is for executing a voice recognition for the voice transmitted via wireless communication from the terminal, wherein the terminal includes:

voice inputting means for inputting the voice;

storing means for storing the inputted voice;

transmitting means for transmitting the stored voice to the voice recognition server;

determining means for determining whether a radio wave environment relating to the wireless communication meets a certain condition; and controlling means for controlling the storing means for storing the inputted voice when it is determined that the radio wave environment does not meet the certain condition, and the transmitting means for transmitting the stored voice to the voice recognition server after it is determined that the radio wave environment meets the certain condition, wherein the stored voice is transmitted to the voice recognition server along with an elapse datum indicating an elapsed time from a time when the inputted voice is stored by the storing means, and wherein the voice recognition server includes:

receiving means for receiving the voice along with the elapse datum transmitted from the terminal;

determining means for determining whether the elapse datum meets a predetermined condition; and voice recognition means for executing, when it is determined that the elapse datum meets the predetermined condition, the voice recognition for the received voice.

7. A computer-readable medium comprising a computer program for a terminal that is provided in a vehicle and constitutes a voice recognition system with a voice recognition server that executes voice recognition for a voice inputted from the terminal, the computer program comprising instructions for:

determining whether radio wave environment relating to the wireless communication meets a certain condition;

storing, when it is determined that the radio wave environment does not meet the certain condition, the inputted voice; and transmitting, after it is determined that the radio wave environment meets the certain condition, the stored voice to the voice recognition server along with an elapse datum indicting an elapsed time from a time when the inputted voice was stored.

8. A terminal that is provided in a vehicle and constitutes a voice recognition system with a voice recognition server that executes voice recognition for a voice received from the terminal via wireless communication, the terminal comprising:

voice inputting means for inputting the voice;

determining means for determining whether a case is unfulfilled, wherein the first case is that a radio wave environment relating to the wireless communication meets a certain condition; and controlling means for controlling the inputting means for prohibiting inputting the voice when the case is determined to be unfulfilled.

9. A terminal according to claim 8, further comprising:

notifying means for executing notification, wherein the controlling means controls the notifying means for executing notification so as to clarify determination by the determining means.

10. A terminal that is provided in a vehicle and constitutes a voice recognition system with a voice recognition server that executes voice recognition for a voice received from the terminal via wireless communication, the terminal comprising:

voice inputting means for inputting the voice;

transmitting means for transmitting the inputted voice to the voice recognition server;

determining means for determining whether a case is unfulfilled, wherein the first case is that a radio wave environment relating to the wireless communication meets a certain condition; and controlling means for controlling the transmitting means for transmitting, when the case is determined to be unfulfilled, to the voice recognition server the inputted voice along with a reference datum indicating the radio wave environment.

11. A terminal according to claim 10, further comprising:

notifying means for executing notification, wherein the controlling means controls the notifying means for executing notification so as to clarify determination by the determining means.

12. A computer-readable medium comprising a computer program for a terminal that is provided in a vehicle and constitutes a voice recognition system with a voice recognition server that executes voice recognition for a voice received from the terminal via wireless communication, the computer program comprising instructions for:

determining whether a case is unfulfilled, wherein the case is that a radio wave environment relating to the wireless communication meets a certain condition; and prohibiting inputting the voice while the case is determined to be unfulfilled.

13. A computer-readable medium comprising a computer program for a terminal that is provided in a vehicle and constitutes a voice recognition system with a voice recognition server that executes voice recognition for a voice inputted from the terminal, the computer program comprising instructions for:

determining whether a case is unfulfilled, wherein the case is that a radio wave environment relating to the wireless communication meets a certain condition; and transmitting, when the case is determined to be not fulfilled, to the voice recognition server the inputted voice along with a reference datum indicating the radio wave environment.

* * * * *